United States Patent
Duan et al.

(10) Patent No.: US 10,086,833 B1
(45) Date of Patent: Oct. 2, 2018

(54) AUTOMOBILE DOOR OPEN HAZARD WARNING SYSTEM AND METHODS

(71) Applicant: GM GLOBAL TECHNOLOGY OPERATIONS LLC, Detroit, MI (US)

(72) Inventors: Chengwu Duan, Shanghai (CN); Peggy Wang, Shanghai (CN); Zhen Gao, Shanghai (CN); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/625,039

(22) Filed: Jun. 16, 2017

(51) Int. Cl.
*B60Q 9/00* (2006.01)
*B60W 30/095* (2012.01)
*G08B 21/04* (2006.01)
*G01S 13/93* (2006.01)

(52) U.S. Cl.
CPC .... *B60W 30/0956* (2013.01); *B60W 30/0953* (2013.01); *G08B 21/0469* (2013.01); *B60Q 9/008* (2013.01); *G01S 2013/9385* (2013.01)

(58) Field of Classification Search
USPC .................................... 340/471, 435, 903
See application file for complete search history.

(56) References Cited

U.S. PATENT DOCUMENTS

| | | | |
|---|---|---|---|
| 4,295,132 A * | 10/1981 | Burney | G08B 29/046 307/652 |
| 4,641,124 A * | 2/1987 | Davis | B60R 25/1018 340/426.23 |
| 2009/0033477 A1* | 2/2009 | Illium | B60R 21/0134 340/436 |
| 2011/0122729 A1* | 5/2011 | Hu | G01S 7/52004 367/98 |
| 2012/0065858 A1* | 3/2012 | Nickolaou | B60Q 9/008 701/70 |
| 2013/0091770 A1* | 4/2013 | Chen | E05F 15/43 49/28 |
| 2014/0098230 A1* | 4/2014 | Baur | B60R 16/0232 348/148 |
| 2016/0221494 A1* | 8/2016 | Chung | B60Q 9/00 |
| 2017/0218678 A1* | 8/2017 | Kothari | E05F 15/40 |
| 2017/0241182 A1* | 8/2017 | Hung | B60J 5/047 |

* cited by examiner

Primary Examiner — Brent Swarthout
(74) Attorney, Agent, or Firm — Lorenz & Kopf, LLP

(57) ABSTRACT

Systems, automobiles, and methods are provided for warning of a potential collision between an approaching object and an opened side door of a vehicle. A system for a vehicle includes an approach sensor, a side door sensor, an alarm, and a controller. The approach sensor is configured to attach to the vehicle and to generate approach sensor data indicating an approaching object that may collide with a side door of the vehicle. The side door sensor is configured to generate door sensor data indicating an impending opening of the side door by an occupant. The alarm is configured to communicate with the occupant. The controller includes an alert initiation module configured to alert the occupant that the approaching object may collide with the side door in response to detecting the impending opening of the side door and detecting the approaching object.

18 Claims, 3 Drawing Sheets

AUTOMOBILE DOOR OPEN HAZARD WARNING SYSTEM AND METHODS

TECHNICAL FIELD

The present disclosure generally relates to approaching object warning systems and methods for vehicles, and more particularly relates to systems and methods for detection and warning of obstacles that may collide with an opened automobile door.

INTRODUCTION

Side doors of automobiles often swing outward when opened. An outwardly swinging side door may increase the width of the automobile significantly when opened. If the occupant of an automobile opens a side door when other vehicles, scooters, bicycles, humans, or other objects are approaching, then those approaching objects may strike the opened side door of the vehicle.

Accordingly, it is desirable to provide systems, vehicles, and methods to reduce the risk of approaching objects striking an opened side door. Furthermore, other desirable features and characteristics of the present invention will become apparent from the subsequent detailed description and the appended claims, taken in conjunction with the accompanying drawings and the foregoing technical field and background.

SUMMARY

Systems, automobiles, and methods are provided for warning of collisions between approaching objects and opened side doors. In one embodiment, a system for a vehicle includes an approach sensor, a side door sensor, an alarm, and a controller. The approach sensor is configured to attach to the vehicle and to generate approach sensor data indicating an approaching object that may collide with a side door of the vehicle. The side door sensor is configured to generate door sensor data indicating an impending opening of the side door by an occupant. The alarm is configured to communicate with the occupant. The controller is in electronic communication with the approach sensor, the side door sensor, and the alarm. The controller includes an alert initiation module configured to alert the occupant that the approaching object may collide with the side door in response to detecting the impending opening of the side door and detecting the approaching object.

In one embodiment, an automobile includes a body, a side door, a side mirror, an approach sensor, a side door sensor, an alarm, and a controller. The side door is pivotably secured to the body and has an interior door handle. The side mirror is attached to the body and the approach sensor is attached to the side mirror and configured to generate approach sensor data. The side door sensor is configured to generate door sensor data associated with a pull of the interior door handle. The alarm is disposed within the body. The controller is in electronic communication with the approach sensor, the side door sensor, and the alarm. The controller includes: a door open detection module configured to detect an intention to open the side door based on the door sensor data; an approaching object module configured to detect an approaching object in mixed traffic that may collide with the side door when the side door is opened; a feature deactivation module configured to activate a timer in response to turning off an engine of the automobile; and an alert initiation module configured to alert an occupant of the automobile that the approaching object may collide with the side door in response to detecting the intention to open the side door, to detecting the approaching object, and to the timer not having expired.

In one embodiment, a method of operating a vehicle includes detecting an object approaching the vehicle from the rear. The method further includes detecting an intention to open a side door of the vehicle from the inside of the vehicle. The method further yet includes warning an occupant of the vehicle that the object may collide with the side door in response to detecting the object approaching and the intention to open the side door.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
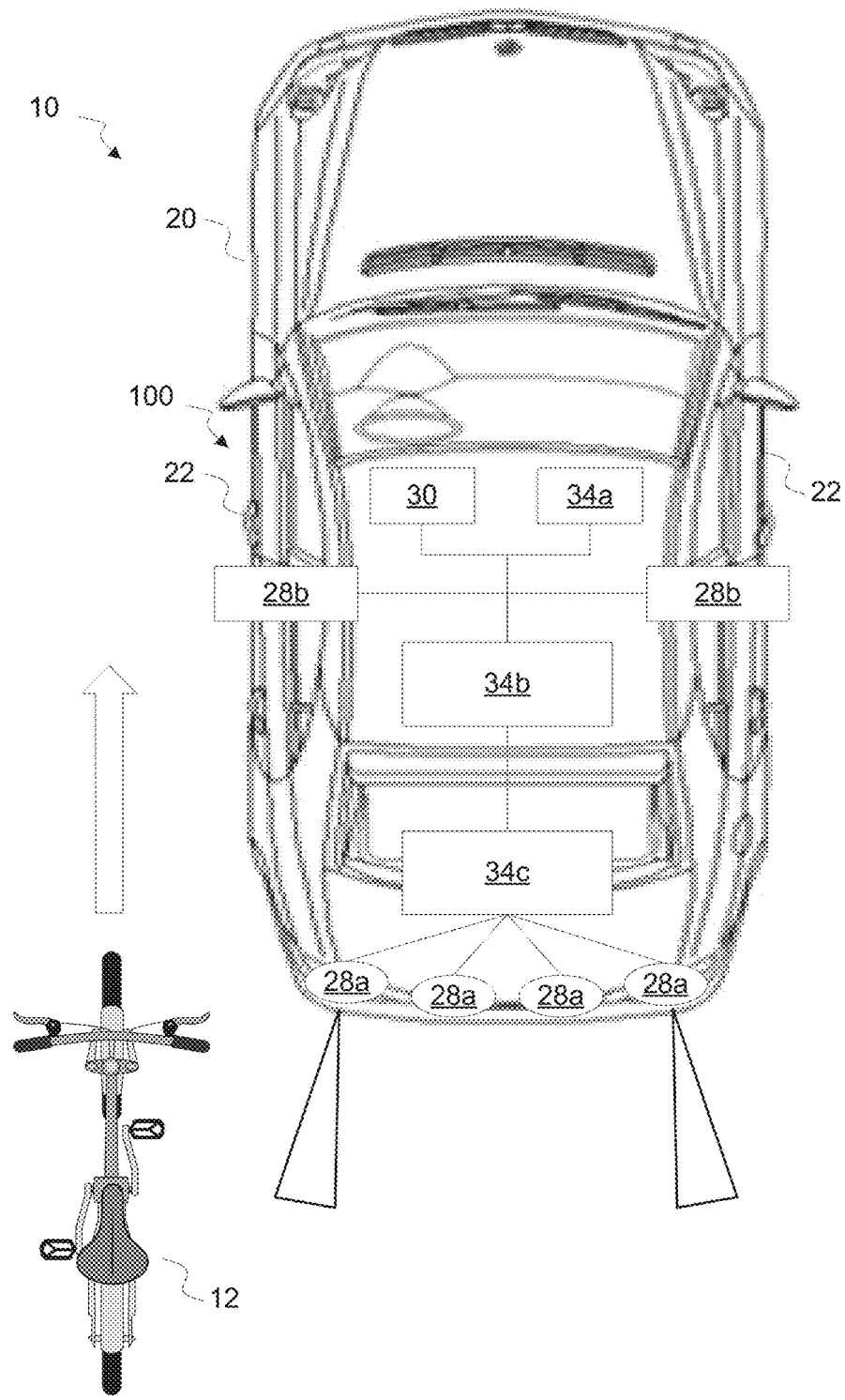
FIG. 1 is a functional block diagram illustrating a mixed traffic situation where a bicycle is approaching a vehicle, in accordance with various embodiments.

With reference to FIG. 1, a vehicle 10 is shown in a mixed traffic situation where a bicycle 12 is approaching vehicle 10 from the rear of vehicle 10. A control system shown generally at 100 is associated with vehicle 10 in accordance with various embodiments. In general, control system 100 identifies a potential collision of mixed traffic objects/vehicles and warns the occupant of the vehicle when control system 100 detects an intention by the occupant to open a side door of the vehicle. In some embodiments, control system 100 may be utilized to warn of potential door collisions when a driver exits vehicle 10 on the side of a highway. For example, the system may be used to warn of fast moving automobiles if vehicle 10 has a flat tire and the driver pulls to the shoulder of the highway to change the tire.

In various embodiments, vehicle 10 is an automobile and control system 100 is incorporated into vehicle 10. The vehicle 10 is depicted in the illustrated embodiment as a passenger car, but it should be appreciated that any other vehicles with doors including trucks, sport utility vehicles (SUVs), recreational vehicles (RVs), etc., can also be used.

As shown, the vehicle 10 generally includes a body 20, side doors 22, sensors 28a-b, at least one data storage device (not illustrated), an alarm 30, and controllers 34a-c.

The sensors 28a-b sense observable conditions of the exterior environment and/or the interior environment of the vehicle 10. The sensors 28a-b can include, but are not limited to, RADARS, LIDARs, optical cameras, thermal cameras, ultrasonic sensors, milimeter wave sensors, and/or other sensors. In the example provided, sensors 28a are approach sensors disposed in a rear bumper of vehicle 10 and are configured to detect objects that are at least partially behind vehicle 10. Sensors 28a may be disposed in locations other than the rear bumper—such as in a side mirror—without departing from the scope of the present disclosure. Sensors 28b are door sensors configured to sense an impending opening of side door 22. In the example provided, each side door sensor 28b is a door handle sensor triggered by actuation of the interior door handle. In some embodiments, each side door sensor 28b is a proximity sensor disposed in the interior of vehicle 10 and configured to detect a hand of an occupant approaching the interior door handle prior to opening side door 22. Alarm 30 may be a speaker, may be a tail light or interior light controller, and/or may be any other type of device configured to communicate with occupants of vehicle 10 and/or operators of the approaching object.

Although three controllers 34a-c are illustrated, it should be appreciated that any number of controllers may be utilized to implement the algorithms described below without departing from the scope of the present disclosure. In the example provided, controller 34a is an engine control module, controller 34b is a body control module, and controller 34c is a backup sensor module, as will be appreciated by those with ordinary skill in the art. The controllers 34a-c include at least one processor (not illustrated) and a computer readable storage device or media (not illustrated). The processor can be any custom made or commercially available processor, a central processing unit (CPU), a graphics processing unit (GPU), an auxiliary processor among several processors associated with the controller, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 10.

The instructions may include one or more separate programs, each of which comprises an ordered listing of executable instructions for implementing logical functions. The instructions, when executed by the processor, receive and process signals from the sensors 28a-b, perform logic, calculations, methods and/or algorithms for automatically controlling the components of the vehicle 10. Embodiments of the vehicle 10 may include any number of controllers that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controllers 34a-c are embodied in the control system 100 and, when executed by the processor, detect and warn of objects approaching vehicle 10 in response to a potential door open indication. For example, controllers 34a-c may evaluate signals from sensors 28a to determine that bicycle 12 is approaching vehicle 10. Controllers 34a-c may then cause alarm 26 to activate for alerting an occupant of vehicle 10 and/or operator of bicycle 12 of a potential collision.

Figure 2:
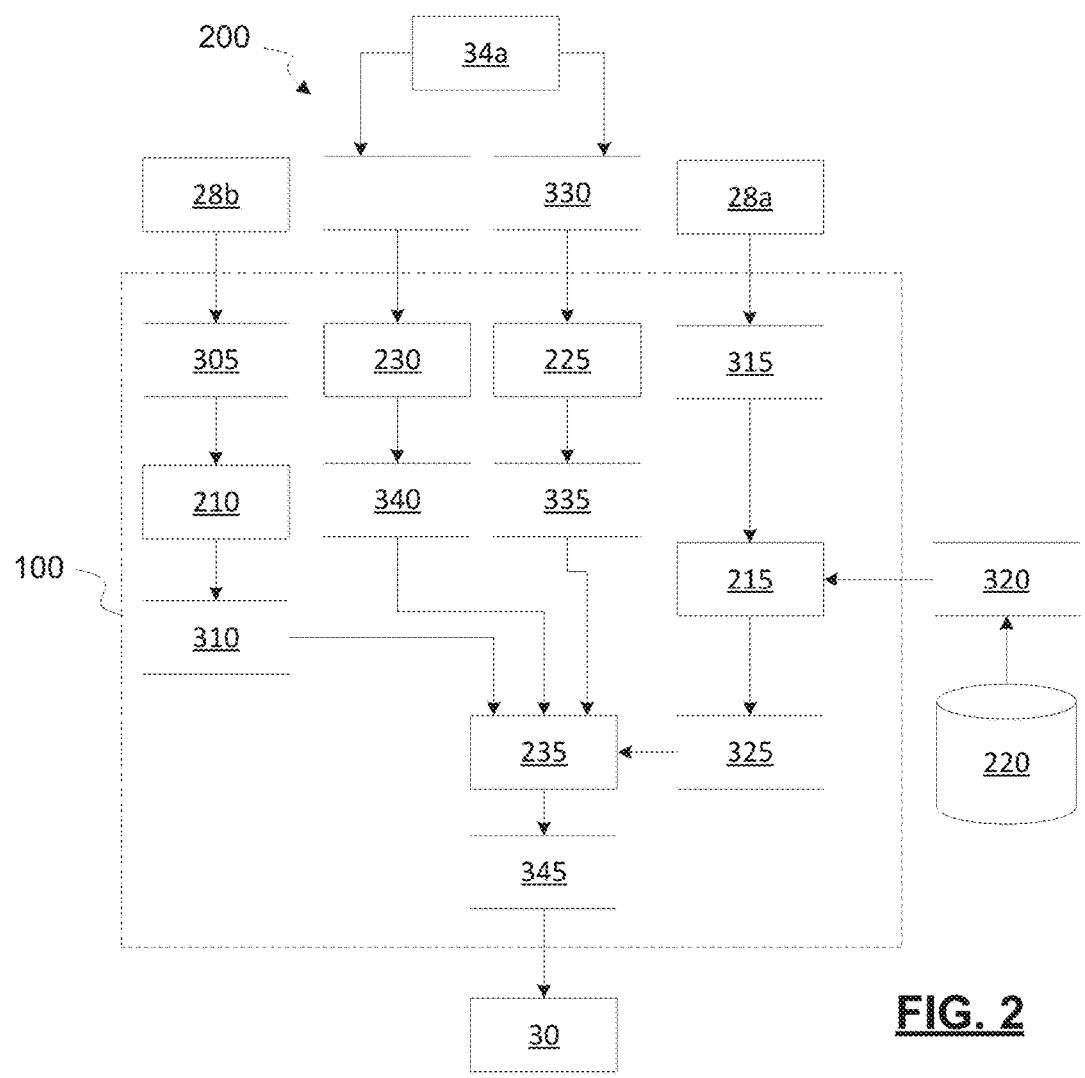
FIG. 2 is a dataflow diagram illustrating a control system of the vehicle of FIG. 1, in accordance with various embodiments.

Referring now to FIG. 2, and with continued reference to FIG. 1, a dataflow diagram 200 illustrates various embodiments of control system 100, which may be embedded within the controllers 34a-c. Various embodiments of the control system 100 according to the present disclosure may include any number of sub-modules embedded within the controllers 34a-c. As can be appreciated, the sub-modules shown in FIG. 2 may be combined and/or further partitioned to similarly control the vehicle 10. Inputs to the control system 100 may be received from the sensors 28a-b, received from other control modules (not shown) associated with the vehicle 10, received from a communication network (not illustrated), and/or determined/modeled by other sub-modules (not shown) within the controllers 34a-c. In various embodiments, control system 100 includes a door open detection module 210, an approaching object module 215, and approach sensor database 220, a feature deactivation module 225, a vehicle speed module 230, and an alert initiation module 235.

Door open detection module 210 receives door sensor data 305 from side door sensors 28b and generates a door open indicator 310 for alert initiation module 235. Door open detection module 210 generates the door open indicator 310 in response to detecting an intention to open side door 22. In the example provided, the intention to open the side door 22 is inferred from a pull or rotation of an interior door handle of side door 22. The door open indicator 310 indicates to alert initiation module 235 that there is an impending opening of side door 22. In some embodiments, the intention to open the side door is inferred when side door sensors 28b are proximity sensors that indicate a limb of an occupant approaching the interior door handle.

Approaching object module 215 receives approach sensor data 315 from approach sensors 28a and approach interpretation data 320 from approach sensor database 220. Approaching object module 215 further generates an approaching object indicator 325 for alert initiation module 235 in response to detecting the approaching object. Approach interpretation data 320 stores criteria for determining when approach sensor data 315 indicates an approaching object. In the example provided, approach sensor data 315 is a raw output from sensors 28a. Approach interpretation data 320 indicates to approaching object module 215 that there is a linear relationship between distance and a voltage of approach sensor data 315 and that an increasing voltage of approach sensor data 315 indicates the approaching object. In some embodiments, approaching object module 215 is configured to generate the approaching object indicator 325 when the relative motion between the approaching object and vehicle 10 is within a predetermined range. For example, the rate of change of the voltage may be utilized to determine the relative speed. In the example provided, approaching object module 215 generates the approaching object indicator 325 when the approaching object is laterally offset from vehicle 10 and is on a path that is substantially parallel to a longitudinal axis of vehicle 10.

Feature deactivation module 225 receives engine status data 330 from controller 34a and generates feature activation status 335 for alert initiation module 235. In the example provided, feature deactivation module 225 initiates a timer in response to determining that the engine has been turned off. Feature activation status 335 indicates that the warning should not be issued and that sensors 28a-b may be powered down after the timer expires.

Vehicle speed module 230 receives vehicle speed data 340 from controller 34a and generates a stopped vehicle indicator 345 for alert initiation module 235. Stopped vehicle indicator 345 indicates when a velocity of vehicle 10 is zero so that vehicle 10 is motionless.

Alert initiation module 235 generates an alarm activation indicator 350 for alarm 30. Alarm activation indicator 350 causes alarm 30 to alert the occupant and/or the operator of the approaching object of the impending door open.

Figure 3:
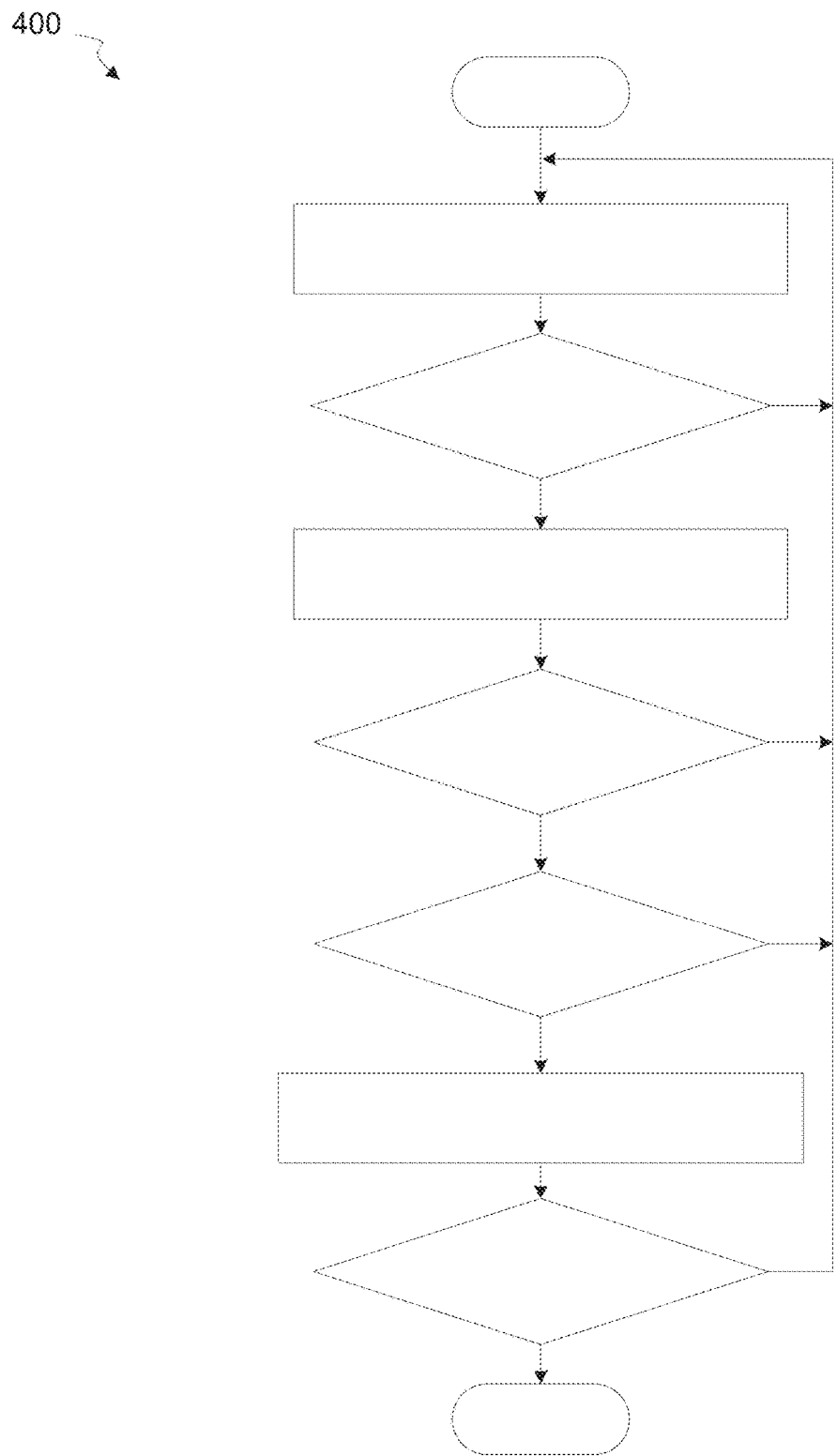
FIG. 3 is a flowchart illustrating a control method for operating the control system of the vehicle of FIG. 1, in accordance with various embodiments.

Referring now to FIG. 3, and with continued reference to FIGS. 1-2, a flowchart illustrates a control method 400 for operating a vehicle that can be performed by the control system 100 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method 400 may be scheduled to run based on one or more predetermined events, and/or may run continuously during operation of the vehicle 10.

In general, method 400 is an algorithm that detects approaching objects (humans, bikes, scooters, etc.) and alerts the vehicle driver or passengers when they intend to open the car door.

Control system 100 monitors a vehicle speed (|v|) in task 410. Control system 100 determines whether |v| is greater than zero in task 415. For example, vehicle speed module 230 may retrieve the current vehicle speed from engine control unit controller 34a and determine when the vehicle is motionless (i.e., |v| is zero). When |v| is greater than zero, method 400 returns to task 410. When |v| is zero, method 400 proceeds to task 420.

Control system 100 monitors sensors in task 420. For example, door open detection module 210 may monitor door sensor data 305 from side door sensors 28b and approaching object module 215 may monitor approach sensor data 315 from approach sensors 28a. As described above, approach sensors 28a may be mounted in a rear bumper or in side mirrors of vehicle 10.

Control system 100 determines whether an object is approaching in task 425. For example, approaching object module 215 may determine that an approaching object may collide with side door 22 of vehicle 10 based on an increasing voltage of approach sensor data 315. In some embodiments, approaching object module 215 compares approach sensor data 315 from multiple approach sensors 28a to determine that the approaching object is laterally separated from the vehicle and is on a path that is substantially parallel to a longitudinal axis of vehicle 10. For example, an automobile directly behind vehicle 10 is not likely to strike side door 22 when side door 22 is opened, so the laterally aligned automobile does not trigger the warning described below. In some embodiments, approaching object module 215 may determine that the approaching object is mixed traffic (e.g., a scooter, bicycle, human, etc.) based on a geographical location, a size of the approaching object, a speed of the approaching object, and/or based on other considerations. In the example provided, the approach sensor is an ultrasonic sensor and approaching object module 215 determines that a bicycle/scooter/human is approaching when the voltage of approach sensor data is linearly increasing at a rate of, for example, 400 mV/s. When an object is not approaching, method 400 returns to task 410. When an object is approaching, method 400 proceeds to task 430.

Control system 100 determines whether there is an intention to open a door of vehicle 10 in task 430. For example, door open detection module 210 may detect a pull on an interior door handle that indicates an impending opening of side door 22 by examining door sensor data 305. In some embodiments, door open detection module 210 detects an impending opening of side door 22 by detecting a limb of an occupant approaching the interior door handle with a proximity sensor. When there is not an intention to open a door, method 400 returns to task 410. When there is an intention to open a door, method 400 proceeds to task 435.

Control system 100 warns the occupant of a potential door collision in task 435. For example, alert initiation module 235 may alert the occupant that the object may collide with side door 22 by generating alarm activation indicator 350 for alarm 30 in response to detecting the intention to open the side door and detecting the approaching object. The alert may be by audio communication using audio speakers in vehicle 10, may be by haptic feedback in seats of vehicle 10, may be by flashing lights inside vehicle 10, and/or may be by any other suitable alerting method. In the example provided, alert initiation module 235 is configured to alert the occupant further in response to the vehicle being motionless as indicated by stopped vehicle indicator 345.

In some embodiments, alert initiation module 235 is further configured to alert an operator of the approaching object of the impending door opening. For example, alert initiation module 235 may initiate alarm 30 to flash a tail light or turn signals of vehicle 10 to alert the operator of bicycle 12 of the impending door opening.

Control system 100 determines whether a timer has expired in task 440. For example, feature deactivation module 225 may initiate a timer following an engine of vehicle 10 turning off. In the example provided, the timer is set to expire two minutes after the engine is turned off. It should be appreciated that other suitable times may be utilized without departing from the scope of the present disclosure. When the timer has not expired, method 400 returns to task 410 to continue providing alerts. When the timer has expired after the engine has not been active for a predetermined amount of time, method 400 ends.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a vehicle, the system comprising:
   an approach sensor configured to attach to the vehicle and to generate approach sensor data indicating an approaching object that may collide with a side door of the vehicle;
   a side door sensor configured to generate door sensor data indicating an impending opening of the side door by an occupant;
   an alarm configured to communicate with the occupant; and
   a controller in electronic communication with the approach sensor, the side door sensor, and the alarm, the controller comprising:
      an approaching object module configured to determine whether the approaching object is mixed traffic and whether the approaching object is on a path that is laterally separated from the vehicle and is substantially parallel to a longitudinal axis of the vehicle, wherein determining whether the approaching object is mixed traffic is based on at least one of geographical location, a size of the approaching object, and a speed of the approaching object;
      an alert initiation module configured to alert the occupant that the approaching object may collide with the side door, wherein the alert initiation module alerts the occupant in response to detecting the impending opening of the side door, determining that the approaching object is mixed traffic on the path, and detecting the approaching object.

2. The system of claim 1, wherein the controller further comprises a vehicle speed module configured to determine when the vehicle is motionless, and wherein the alert initiation module is configured to alert the occupant further in response to the vehicle being motionless.

3. The system of claim 2, wherein the controller further comprises an approaching object module configured to indicate the approaching object based on an increasing voltage of the approach sensor data.

4. The system of claim 3, wherein the controller further comprises a feature deactivation module configured to disable the alarm after a predetermined amount of time during which the alarm is enabled following an engine of the vehicle turning off.

5. The system of claim 1, wherein the approach sensor is configured to be mounted in a side mirror of the vehicle.

6. The system of claim 1, wherein the approach sensor is configured to be mounted in a rear bumper of the vehicle.

7. The system of claim 1, wherein the side door sensor is a door handle sensor configured to detect a pull on an interior door handle of the vehicle to indicate the impending opening.

8. The system of claim 1, wherein the side door sensor is a proximity sensor configured to detect a limb approaching an interior door handle of the vehicle to indicate the impending opening.

9. The system of claim 1, wherein the alert initiation module is further configured to alert an operator of the approaching object of the impending opening by at least one of flashing a tail light of the vehicle and flashing a turn signal of the vehicle.

10. An automobile, comprising:
    a body;
    a side door pivotably secured to the body and having an interior door handle;
    a side mirror attached to the body;
    an approach sensor attached to the side mirror and configured to generate approach sensor data;
    a side door sensor configured to generate door sensor data associated with a pull of the interior door handle;
    an alarm disposed within the body; and
    a controller in electronic communication with the approach sensor, the side door sensor, and the alarm, the controller comprising:
       a door open detection module configured to detect an intention to open the side door based on the door sensor data;
       a vehicle speed module configured to determine when the vehicle is motionless;
       an approaching object module configured to detect an approaching object, to determine whether the approaching object is mixed traffic, and to determine whether the approaching object is on a path that is laterally separated from the vehicle and is substantially parallel to a longitudinal axis of the vehicle, wherein determining whether the approaching object is mixed traffic is based on at least one of geographical location, a size of the approaching object, and a speed of the approaching object;
       a feature deactivation module configured to activate a timer in response to turning off an engine of the automobile; and
       an alert initiation module configured to alert an occupant of the automobile that the approaching object may collide with the side door in response to detecting the intention to open the side door, to detecting the approaching object, to determining that the approaching object is mixed traffic on the path, to the vehicle being motionless, and to the timer not having expired.

11. The automobile of claim 10, wherein the alert initiation module is further configured to alert an operator of the approaching object of the intention to open the side door by commanding a tail light of the automobile to illuminate.

12. The automobile of claim 10, wherein the approaching object module is further configured to indicate the approaching object based on an increasing voltage of the approach sensor data.

13. A method of operating a vehicle, the method comprising:
    detecting an object approaching the vehicle;

determining whether the object is on a path that is substantially parallel to a longitudinal axis of the vehicle and that is laterally offset from the vehicle;

determining whether the object is mixed traffic is based on at least one of geographical location, a size of the object, and a speed of the object;

determining whether the vehicle is motionless;

detecting an intention to open a side door of the vehicle from the inside of the vehicle; and warning an occupant of the vehicle that the object may collide with the side door in response to detecting the object approaching and the intention to open the side door, to determining that the object is on the path, to determining that the object is mixed traffic, and to determining that the vehicle is motionless.

14. The method of claim 13, wherein warning the occupant is further in response to an engine of the vehicle having been active within a predetermined amount of time.

15. The method of claim 13, wherein detecting the object approaching the vehicle is based on approach sensor data generated by an approach sensor mounted in a body of the vehicle and oriented to detect the object to the rear of the vehicle.

16. The method of claim 15, wherein detecting the object approaching the vehicle is further based on a rate of change of a voltage of the approach sensor.

17. The method of claim 13, wherein detecting an impending opening of the side door of the vehicle includes detecting a pull on an interior door handle of the vehicle.

18. The method of claim 13, wherein detecting an impending opening of the side door of the vehicle includes detecting a limb approaching an interior door handle of the vehicle with a proximity sensor.

* * * * *